United States Patent
Plantenberg et al.

(10) Patent No.: US 10,331,878 B2
(45) Date of Patent: *Jun. 25, 2019

(54) UNIFIED USER IDENTIFICATION WITH AUTOMATIC MAPPING AND DATABASE ABSENCE HANDLING

(71) Applicant: ServiceNow, Inc., Santa Clara, CA (US)

(72) Inventors: Demyn Lee Plantenberg, Sunnyvale, CA (US); Frank B. Schmuck, Campbell, CA (US); Yuri Volobuev, Champaign, IL (US)

(73) Assignee: SERVICENOW, INC., Santa Clara, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/134,972

(22) Filed: Apr. 21, 2016

(65) Prior Publication Data
US 2016/0239679 A1    Aug. 18, 2016

Related U.S. Application Data

(63) Continuation of application No. 14/147,675, filed on Jan. 6, 2014, now Pat. No. 9,325,712, which is a
(Continued)

(51) Int. Cl.
    *G06F 7/00*     (2006.01)
    *G06F 17/00*    (2019.01)
    *G06F 21/45*    (2013.01)

(52) U.S. Cl.
    CPC .................... *G06F 21/45* (2013.01)

(58) Field of Classification Search
    None
    See application file for complete search history.

(56) References Cited

U.S. PATENT DOCUMENTS

| 6,389,427 B1 | 5/2002 | Faulkner |
| 6,446,253 B1 | 9/2002 | Mellmer |

(Continued)

OTHER PUBLICATIONS

Ryutov, Tatyana; "Representation and Evaluation of Security Policies for Distributed System Services", Proceedings of DARPA Information Survivability Conference, Jan. 2000, pp. 172-183, Hilton Head, SC.

(Continued)

*Primary Examiner* — Tuan A Pham
(74) *Attorney, Agent, or Firm* — Fletcher Yoder PC

(57) ABSTRACT

An identification system that may be used in heterogeneous computing environments provides a fail-free path to providing identifiers from a single canonical namespace. Objects or gateways requiring an identifier for access are accessed using an identifier for the canonical namespace. If an entity requests access using an identifier from another namespace, an external database is consulted to determine if a mapping exists for the identifier to another identifier the canonical namespace. If no mapping exists, or the external database is unavailable, then an identifier is automatically generated in the canonical namespace and is used for the access. An internal database is updated with the automatically generated identifier, providing a mechanism to add mappings without administrative intervention. To access resources requiring an identifier from another particular namespace, a canonical namespace identifier may be mapped to another identifier in the particular namespace, or a generic identifier may be used.

18 Claims, 3 Drawing Sheets

Related U.S. Application Data continuation of application No. 13/768,127, filed on Feb. 15, 2013, now Pat. No. 8,700,664, which is a continuation of application No. 13/425,019, filed on Mar. 20, 2012, now Pat. No. 8,447,780, which is a continuation of application No. 13/287,189, filed on Nov. 2, 2011, now Pat. No. 8,180,794, which is a continuation of application No. 12/549,205, filed on Aug. 27, 2009, now Pat. No. 8,086,633.

(56) References Cited

U.S. PATENT DOCUMENTS

| | | |
|---|---|---|
| 6,732,172 B1 | 5/2004 | House et al. |
| 7,017,183 B1 | 3/2006 | Frey et al. |
| 7,340,723 B2 | 3/2008 | Antonov et al. |
| 7,512,608 B2 | 3/2009 | Loeser et al. |
| 7,584,219 B2 | 9/2009 | Zybura et al. |
| 7,672,945 B1 | 3/2010 | Chatterjee et al. |
| 7,730,089 B2 | 6/2010 | Campbell et al. |
| 8,086,633 B2 | 12/2011 | Plantenberg et al. |
| 8,180,794 B2 | 5/2012 | Plantenberg et al. |
| 8,230,050 B1 | 7/2012 | Brandwine et al. |
| 8,272,039 B2 | 9/2012 | Bennett et al. |
| 8,275,826 B2 | 9/2012 | Kakivaya et al. |
| 8,312,046 B1 | 11/2012 | Eisler et al. |
| 8,335,921 B2 | 12/2012 | von Behren et al. |
| 8,364,711 B2 | 1/2013 | Wilkins et al. |
| 8,447,780 B1 | 5/2013 | Plantenberg et al. |
| 8,700,664 B2 | 4/2014 | Plantenberg et al. |
| 9,325,712 B2 | 4/2016 | Plantenberg et al. |
| 9,524,167 B1* | 12/2016 | Cohn .................. G06F 9/30098 |
| 2002/0112045 A1 | 8/2002 | Nirkhe et al. |
| 2003/0028808 A1 | 2/2003 | Kameda |
| 2003/0237002 A1 | 12/2003 | Oishi et al. |
| 2004/0181696 A1* | 9/2004 | Walker .................. G06F 21/31 726/6 |
| 2005/0005260 A1 | 1/2005 | Antonov et al. |
| 2005/0097073 A1* | 5/2005 | Mair ...................... G06F 21/41 |
| 2006/0287767 A1 | 12/2006 | Kraft |
| 2007/0005620 A1 | 1/2007 | Loeser et al. |
| 2007/0050395 A1 | 3/2007 | Hunter et al. |
| 2008/0126369 A1 | 5/2008 | Ellard |
| 2008/0205655 A1 | 8/2008 | Wilkins et al. |
| 2008/0263640 A1 | 10/2008 | Brown |
| 2008/0281967 A1 | 11/2008 | Muhlestein et al. |
| 2009/0030957 A1 | 1/2009 | Manjunath |
| 2009/0171926 A1 | 7/2009 | Loeser et al. |
| 2009/0177756 A1 | 7/2009 | Gunda et al. |

OTHER PUBLICATIONS

Notice of Allowance in U.S. Appl. No. 12/549,205 dated Aug. 19, 2011, 24 pp (pp. 1-24 in pdf).
Notice of Allowance in U.S. Appl. No. 13/287,189 dated Jan. 10, 2012, 32 pp (pp. 1-32 in pdf).
Notice of Allowance in U.S. Appl. No. 13/425,019 dated Jan. 17, 2013, 20 pp (pp. 1-20 in pdf).
Notice of Allowance in U.S. Appl. No. 13/768,127 dated Dec. 2, 2013, 21 pp (pp. 1-21 in pdf).

* cited by examiner

UNIFIED USER IDENTIFICATION WITH AUTOMATIC MAPPING AND DATABASE ABSENCE HANDLING

CROSS-REFERENCE TO RELATED APPLICATION(S)

The present application is a continuation of U.S. patent application Ser. No. 14/147,675, filed on Jan. 6, 2014; which is a continuation of U.S. Pat. No. 8,700,664, issued on Apr. 15, 2014; which is a continuation of U.S. Pat. No. 8,447,780, issued on May 21, 2013; which is a continuation of U.S. Pat. No. 8,180,794, issued on May 15, 2012; and which is a continuation of U.S. Pat. No. 8,086,633 on Dec. 27, 2011, which are incorporated herein in their entirety by reference.

TECHNICAL FIELD

This disclosure relates to security authentication in computer systems, and more specifically to an authentication system that provides unified user identification across multiple namespaces.

BACKGROUND

In networked computer systems, and in particular, in heterogeneous networking environments across multiple operating systems, entity authentication presents a management challenge. Entities, or in the present context, security principals, may be individual users, groups, particular machines, and the like. Entities are typically externally identified by a user ID or name that provides a symbolic tag, but internally, a numeric tag is typically associated with the entity as a practical measure. The numeric tag then provides a uniform identifier in the particular environment, such as security identifier objects (SIDs) used in Microsoft WINDOWS, or group and user identifiers as used in UNIX-type operating systems. (UNIX is a trademark of The Open Group.) Application programming interfaces (APIs) that access secured objects generally require such a numeric tag as an input, either directly or implicitly, as do gateways such as network portals.

Typically, an external database is used to map an entity identifier from one namespace to all of the various namespaces that the entity might encounter. An entity should be able to access the same set of objects irrespective of the operating system, network, machine, etc. from which an access occurs. Therefore, a large number of mappings may be required to and from various namespaces associated with various operating systems, machines and in some instances particular sub-systems or applications. Such identifier mappings have several drawbacks. First, the database must typically be fully populated before use, which is a labor-intensive process and has a high barrier to entry. Second, the reliance on an external database is a security vulnerability that is continuously exposed. Finally, it is frequently impractical to query a platform-specific database from a different platform, making the interface to the external database awkward for at least some of the access paths.

Therefore, it would be desirable to provide an identification method and system that provides uniform identification, can provide automatic population of identifiers and that adapts easily to access paths from different platforms.

SUMMARY

The invention is embodied in a computer-performed method, computer program product and computer system that authenticates entities generating accesses in a computer system.

Accesses to objects or gateways in the computer system, which may be a network of computers executing different operating systems, is made using canonical identifiers from a single namespace. Accesses directly specifying an identifier from the canonical namespace are made directly, while accesses made with identifiers from other namespaces are looked up in an external mapping database to obtain corresponding identifiers in the canonical namespace. If the external mapping database is not available or the identifier is not already present, a new identifier is automatically generated and used for the present access, and generally an entire session. The automatically-generated identifier is stored in an internal database and used for subsequent accesses by the same entity, making it possible to automatically populate the canonical namespace. The external database, if available, can be periodically polled to determine if the entity obtains an identifier in the same namespace mapped to by an automatically generated mapping, indicating a conflict. The external database lookup results are used to resolve the conflict.

Accesses to objects or gateways requiring an identifier from another particular namespace may be handled by a database lookup that obtains an identifier in the particular namespace that corresponds to the identifier from the canonical namespace. Alternatively, a generic identifier from the particular namespace may be assigned to all accesses from the canonical namespace.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present invention relates to computer security systems, and specifically identification of entities, including users, groups, and the like between systems and software requiring identifiers from differing namespaces. A canonical namespace is managed such that a fail-free path is provided for accesses made via identifiers from other namespaces. When an identifier from another namespace is used for the access, an external mapping database is consulted to determine if a corresponding identifier from the canonical namespace is present in the external database. If the external database is not available, or the corresponding identifier is not present in the external database, an identifier in the canonical namespace is automatically generated. The generated identifiers are stored in an internal database, making it possible to populate the internal database automatically. Accesses requiring identifiers from another namespace can be made using a canonical identifier to look up corresponding identifiers in the other namespace, or by assigning a generic identifier in the another namespaces to identifiers in the canonical namespace. The external database can be periodically polled to discover any new or changed mappings for identifiers of interest. If a new or changed external mapping is discovered that conflicts with an existing automatically generated mapping stored in the internal database, the external mapping is used.

Figure 1:
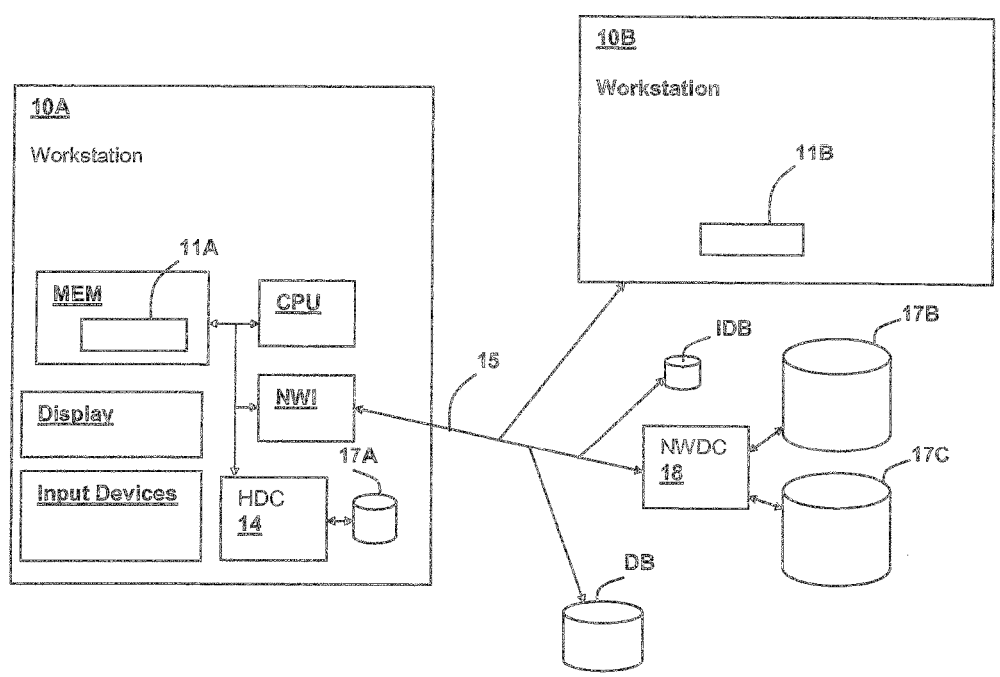
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. A first workstation computer system 10A includes a processor CPU coupled to a memory MEM that contains program instructions for execution by CPU, including a virtual file system (VFS) interface 11A, which provides a native file system interface to the particular operating system executed by workstation computer system 10A, for example the WINDOWS operating system. Workstation computer system 10A is also depicted as including a graphical display Display and input devices Input Devices, such as mice and keyboards, for interacting with user interfaces including login screens and other user interfaces for interacting with other computers connected to the network, for example, administration screens for administering identification and authorization profiles used by the techniques of the present invention.

Workstation computer system also includes a hard disc controller HDC 14 that interfaces processor CPU to local storage device 17A and a network interface that couples workstation computer system 10A to network 15, which may be fully wireless, fully wired or any type of hybrid network. VFS interface 11A provides a uniform set of application programming interfaces (APIs) that provide access to resources, such as local storage device 17A or remote storage such as storage devices 17B and 17C, which are coupled to network 15 by network disc controller (NWDC) 18. An external mapping database DB, external to the VFS, provides storage for traditional administrative mapping information as will be described in further detail below, and which may be a single database, or comprise multiple databases. An internal mapping database IDB provides for storage of automatically-generated identifier mappings and is internal to the VFS, which means that internal database IDB is owned by the VFS and is not generally accessible to other sub-systems. Another workstation computer system 10B, having an internal organization similar to that depicted in workstation computer system 10A, is coupled to network 15 and executes a different operating system, e.g., UNIX. A different VFS client 11B is provided and executed within workstation computer system 10B to provide suitable native APIs for accessing storage within workstation computer system 10B, networked storage devices 17B and 17C, as well as local storage device 17A within workstation computer system 10A, if local storage device 17A is shared.

Network 15 may include wireless local area networks (WLANs), wired local-area networks (LANs), wide-area networks (WANs) or any other suitable interconnection that provides communication between workstation computer systems 10A and 10B, local storage devices 17A-17C, external database DB and any other systems and devices coupled to network 15. Internal database DB is generally a file stored within a storage device, such as one of local storage devices 17A-17C, and is thereby accessible by file system interface objects 11A and 11B over network 15. Further, the present invention concerns identification functionality that is not limited to a specific computer system or network configuration. Finally, the specification workstation computer systems 10A and 10B and the location of their specific memory MEM and file system interface objects 11A and 11B does not imply a specific client-server relationship or hierarchical organization, as the techniques of the present invention may be employed in distributed systems in which no particular machine is identified as a server, but at least one of the machines provides an instance and functionality of an object or interface that performs identification in accordance with an embodiment of the present invention. The objects or interfaces process accesses according to methods and structures of the present invention, as described in further detail below.

Figure 2:
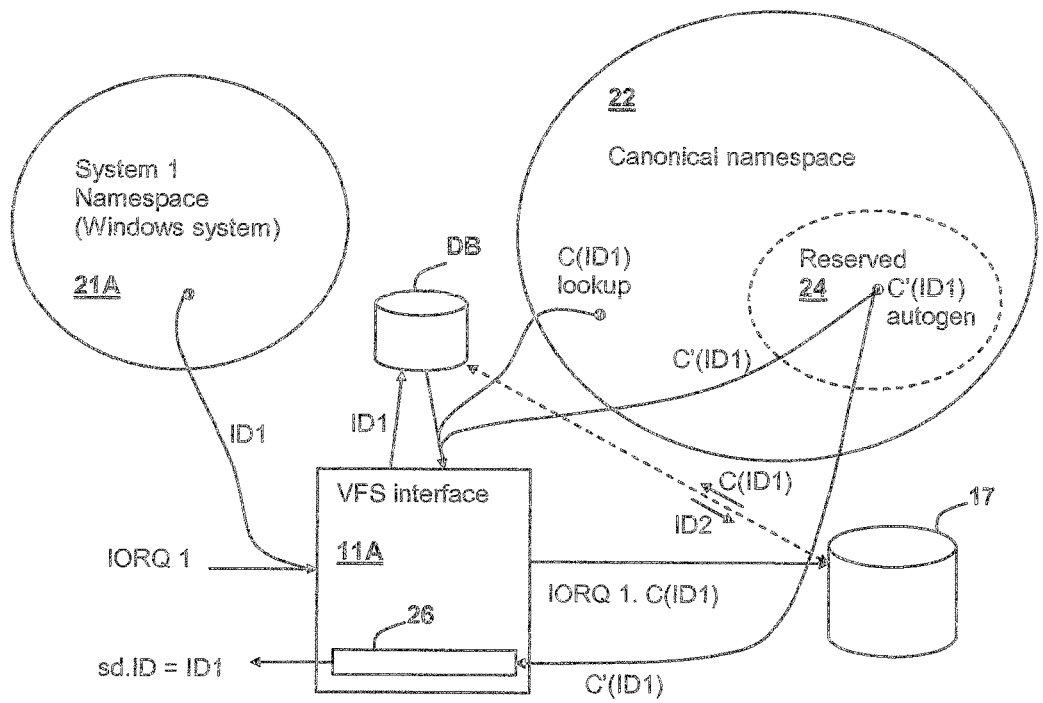
FIG. 2 is a pictorial diagram showing accesses to objects and the relationship of identifier namespaces within the system of FIG. 1.

Referring now to FIG. 2, a pictorial diagram illustrating a relationship between identifiers and interfaces within the system of FIG. 1 is shown. The depicted structure is only one of many possible program structures for implementing the identification methodology described herein, and is provided as an example of an embodiment of a structure in accordance with an embodiment of the present invention, performing an exemplary set of accesses. An input/output request (IORQ) IORQ 1 is received at VFS interface 11A and has associated with it, an entity identifier ID1 from system 1 namespace 21A, e.g., a security identifier (SID) as is used in Windows operating systems. In the example, I/O request IORQ 1 targets storage device 17, which contains a UNIX-based file system image. In order to access target storage device 17, a suitable identifier must be provided when VFS interface 11A passes I/O request IORQ 1 along to the file system driver managing storage device 17. In order to provide the identifier, VFS interface 11A (or a remote object or service called by VFS interface 11A) queries database DB for an entry matching identifier ID1. If database DB is available, and the entry is present, the member C(ID1) of canonical namespace 22 corresponding to identifier ID1 is obtained from database DB1. Otherwise, a new identifier is automatically generated C'(ID1) in a reserved portion 24 of canonical namespace 22. In practice, identifiers such as identifier C'(ID1) are not generated for each access, rather internal database IDB stores all such automatically generated identifiers, so that subsequent accesses by the same entity will be mapped by internal database IDB directly to canonical namespace 22. A reserved portion 24 of canonical namespace 22 is used to ensure that no overlap of automatically-generated identifiers occurs with another identifier already being used, e.g., by a mapping in external database DB. In the exemplary embodiment, the automatically-generated identifiers are constructed by incrementing a counter, as other than the uniqueness of each identifier, no special significance nor information is contained in the identifier itself, only the mapping to the corresponding identifiers e.g. identifier ID1 in the other namespace(s) is important in general. However, alternative techniques such as hashing or other computation may be used to generate the automatically-generated identifiers. Once identifier C'(ID1) is generated, it is stored in internal database IDB for future use, since any files that become owned or are created by the entity identified by identifier C'(ID1) will require the owner.

In the depicted example, for generality, the file system driver managing local storage device 17 is depicted as requiring identifiers from canonical namespace 22. However, under certain circumstances, an identifier from canonical namespace 22 or another namespace may be needed as a return value to the originating platform. For example, when a query from a WINDOWS operating system is made to obtain the owner of a file which in WINDOWS is a security identifier sd.SID. In order to provide a security identifier for a file having an owner identified only in canonical namespace 22, a conversion algorithm 26 may be used to generate an artificial, but compatible, security identifier sd.SID from canonical ID C'(ID1). Alternatively, a dummy or generic identifier compatible with namespace 21A may be provided from VFS interface 11A in response to a request for an owner identifier of a file whose owner is not identified in namespace 21A.

It is understood that the techniques illustrated above apply to object accesses in general, and storage devices/files are only an illustrative example of an object type for which access may be mapped according to embodiments of the present invention. Further, it is understood that the mapping provided by the above-described technique is not a 1:1 security mapping, but for automatically-generated identifiers, can provide some level of access, e.g., that level of access available to non-owner non-group members in UNIX. However, once the identifiers are populated in database DB in traditional administrative fashion, or automatically generated and stored in internal database IDB, permissions can be subsequently tailored to the entity's needs. For example, a user may access a UNIX storage device from a WINDOWS operating system temporarily, receiving access to directories such as /tmp via identifier ID1 mapped to automatically-generated canonical namespace identifier C'(ID1). Subsequently the entity can arrange for an administrator to set permissions for accessing /usr/entity1, providing the same permissions as entity1 has under their normal UNIX account, for example.

Figure 3:
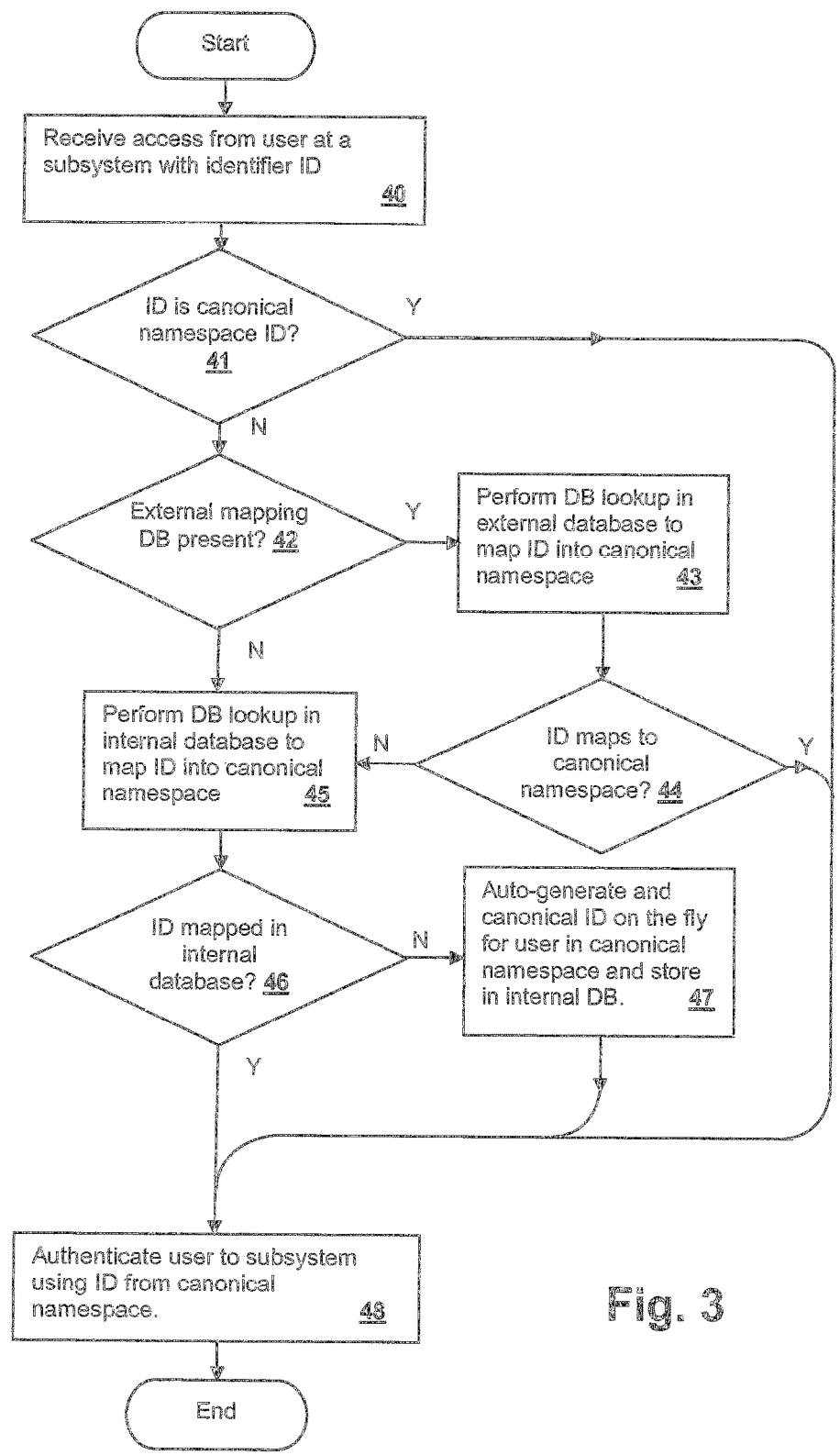
FIG. 3 is a flow chart of a method in accordance with an embodiment of the present invention.

Referring now to FIG. 3, a method in accordance with an embodiment of the present invention is illustrated in a flowchart. In the depicted method, an access attempt including an identifier ID is received by a subsystem (step 40). If the ID is from the canonical namespace (decision 41), then the access is made using the ID from the canonical namespace (step 48). (The illustrative embodiment of FIG. 3 presumes that the ultimate access is made from the canonical namespace, so no second lookup is required.) If the ID is not from the canonical namespace (decision 41), a check is performed to determine if external database DB is present (decision 42). If external database DB is present (decision 42), then a lookup is performed in database DB to obtain the corresponding identifier to identifier ID in the canonical namespace (step 43). If the ID maps to the canonical namespace (decision 44), then the access is made with the ID retrieved from database DB in the canonical namespace (step 48). If external database DB is not present (decision 42) or the ID is not mapped to the canonical namespace in external database DB (decision 44), then a lookup is performed in internal database to determine if a previously auto-generated mapping to the canonical namespace is already present for the entity (decision 46). If a previous auto-generated mapping exists (decision 46), the access is then made using the ID from the canonical namespace retrieved from internal database IDB (step 48). If a previous auto-generated mapping does not exist (decision 46), an ID in the canonical namespace is automatically generated for the entity and stored in internal database IDB (step 47), then the access is made using the new ID from the canonical namespace (step 48).

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for controlling access to a resource configured for a first operating system with a canonical namespace, the system comprising:
   a processor; and
   a memory,
   wherein the memory includes instructions executable by the processor to:
   receive an input/output request that targets the resource from an entity having a second operating system with a namespace different than the canonical namespace, the input/output request including a first entity identifier that is in accordance with the namespace and identifies the entity requesting access to the resource;
   automatically generate and associate a second entity identifier that is in accordance with the canonical namespace to the first entity identifier, in response to a determination that the first entity identifier is not in the canonical namespace and is not associated to the canonical namespace;
   access the resource using the second entity identifier, wherein the resource is accessible using entity identifiers in the canonical namespace and the second entity identifier is a member of the canonical namespace, wherein the input/output request further includes a second input/output request for an owner entity identifier associated with the resource, the second input/output request including a first owner entity identifier that is in the canonical namespace, wherein the owner entity identifier is a member of another namespace;
   return a second owner entity identifier in response to a determination that the first owner entity identifier is mapped to the another namespace, wherein the second owner entity identifier is a member of the another namespace and is obtained in response to the determination that the first owner entity identifier is mapped to the another namespace; and
   return a third owner entity identifier in response to a determination that the first owner entity identifier is not mapped to the another namespace, wherein the third owner entity identifier is a member of the another namespace and is generated in response to the determination that the first entity owner identifier is not mapped to the another namespace.

2. The system of claim 1, wherein the memory further includes instructions executable by the processor to:
   query a database for a mapping of the first entity identifier to a third entity identifier, wherein the third entity identifier is in the canonical namespace and is associated with the entity; and
   determine whether the mapping of the first entity identifier to the third entity identifier exists within the database based on the query.

3. The system of claim 2, wherein the memory further includes instructions executable by the processor to:
   generate the second entity identifier in response to a determination that the third entity identifier does not exist within the database.

4. The system of claim 2, wherein the memory further includes instructions executable by the processor to:

obtain the third entity identifier in response to a determination that the third entity identifier exists within the database; and access the resource using the third entity identifier.

5. The system of claim 1, wherein the memory further includes instructions executable by the processor to:

identify, within a database, a new or changed mapping for an entity identifier that is in the canonical namespace; and resolve a conflict between the new or changed mapping and the second entity identifier using the new or changed mapping.

6. The system of claim 1, wherein the memory further includes instructions executable by the processor to:

access the resource using the first entity identifier in response to a determination that the first entity identifier is in the canonical namespace.

7. A method for controlling access to a resource configured for a first operating system with a canonical namespace, the method comprising:

receiving an input/output request that targets the resource from an entity having a second operating system with a namespace different than the canonical namespace, the input/output request including a first entity identifier that is in accordance with the namespace and identifies the entity requesting access to the resource;

automatically generating and associating a second entity identifier that is in accordance with the namespace to the first entity identifier, in response to determining that the first entity identifier is not in the canonical namespace and is not associated to the canonical namespace;

accessing the resource using the second entity identifier, wherein the resource is accessible using entity identifiers in the canonical namespace and the second entity identifier is a member of the canonical namespace, wherein the input/output request further includes a second input/output request for an owner entity identifier associated with the resource, the second input/output request including a first owner entity identifier that is in the canonical namespace, wherein the owner entity identifier is a member of another namespace;

returning a second owner entity identifier in response to determining that the first owner entity identifier is mapped to the another namespace, wherein the second owner entity identifier is a member of the another namespace and is obtained in response to the determining that the first owner entity identifier is mapped to the another namespace; and returning a third owner entity identifier in response to a determining that the first owner entity identifier is not mapped to the another namespace, wherein the third owner entity identifier is a member of the another namespace and is generated in response to the determining that the first owner entity identifier is not mapped to the another namespace.

8. The method of claim 7, the method further comprising:

querying a database for a mapping of the first entity identifier to a third entity identifier, wherein the third entity identifier is in the canonical namespace and is associated with the entity; and determining whether the mapping of the first entity identifier to the third entity identifier exists within the database based on the querying.

9. The method of claim 8, the method further comprising:

generating the second entity identifier in response to determining that the third entity identifier does not exist within the database.

10. The method of claim 8, the method further comprising:

obtaining the third entity identifier in response to determining that the third entity identifier exists within the database; and accessing the resource using the third entity identifier.

11. The method of claim 7, further comprising:

identifying, within a database, a new or changed mapping for an entity identifier that is in the canonical namespace; and resolving a conflict between the new or changed mapping and the second entity identifier using the new or changed mapping.

12. The method of claim 7, further comprising:

accessing the resource using the first entity identifier in response to determining that the first entity identifier is in the canonical namespace.

13. A computer program product comprising non-transitory computer-readable storage media storing program instructions for execution by a processor for controlling access to a resource configured for a first operating system with a canonical namespace, wherein the program instructions include instructions for:

receiving an input/output request that targets the resource from an entity having a second operating system with a namespace different than the canonical namespace, the input/output request including a first entity identifier that is in accordance with the namespace and identifies the entity requesting access to the resource;

automatically generating and associating a second entity identifier that is in accordance with the canonical namespace to the first entity identifier, in response to determining that the first entity identifier is not in the canonical namespace and is not associated to the canonical namespace;

accessing the resource using the second entity identifier, wherein the resource is accessible using entity identifiers in the canonical namespace and the second entity identifier is a member of the canonical namespace, wherein the input/output request further includes a second input/output request for an owner entity identifier associated with the resource, the second input/output request including a first owner entity identifier that is in the canonical namespace, wherein the owner entity identifier is a member of another namespace;

returning a second owner entity identifier in response to a determination that the first owner entity identifier is mapped to the another namespace, wherein the second owner entity identifier is a member of the another namespace and is obtained in response to the determination that the first owner entity identifier is mapped to the another namespace; and returning a third owner entity identifier in response to a determination that the first owner entity identifier is not mapped to the another namespace, wherein the third owner entity identifier is a member of the another namespace and is generated in response to the determination that the first entity owner identifier is not mapped to the another namespace.

14. The computer program product of claim 13, wherein the program instructions further include instructions for:

querying a database for a mapping of the first entity identifier to a third entity identifier, wherein the third entity identifier is in the canonical namespace and is associated with the entity; and determining whether the mapping of the first entity identifier to the third entity identifier exists within the database based on the querying.

15. The computer program product of claim 14, wherein the program instructions further include instructions for:

generating the second entity identifier in response to determining that the third entity identifier does not exist within the database.

16. The computer program product of claim 14, wherein the program instructions further include instructions for:

obtaining the third entity identifier in response to determining that the third entity identifier exists within the database; and accessing the resource using the third entity identifier.

17. The computer program product of claim 13, wherein the program instructions further include instructions for:

identifying, within a database, a new or changed mapping for an entity identifier that is in the canonical namespace; and resolving a conflict between the new or changed mapping and the second entity identifier using the new or changed mapping.

18. The computer program product of claim 13, wherein the program instructions further include instructions for:

accessing the resource using the first entity identifier in response to determining that the first entity identifier is in the canonical namespace.

\* \* \* \* \*